(12) United States Patent
Wang (10) Patent No.: US 9,266,760 B2
(45) Date of Patent: Feb. 23, 2016

(54) OZONE FAUCET

(71) Applicant: Hsiang-Shih Wang, Changhua (TW)

(72) Inventor: Hsiang-Shih Wang, Changhua (TW)

(73) Assignee: Geann Industrial Co., Ltd., Chang Hua Hsien (TW)

( * ) Notice: Subject to any disclaimer, the term of this patent is extended or adjusted under 35 U.S.C. 154(b) by 181 days.

(21) Appl. No.: 14/148,786

(22) Filed: Jan. 7, 2014

(65) Prior Publication Data

US 2015/0191381 A1    Jul. 9, 2015

(51) Int. Cl.
*C02F 1/78* (2006.01)
*C02F 1/68* (2006.01)
*E03C 1/04* (2006.01)
*B01F 3/04* (2006.01)
*B05B 1/00* (2006.01)
*E03C 1/046* (2006.01)

(52) U.S. Cl.
CPC ............... *C02F 1/78* (2013.01); *B01F 3/04099* (2013.01); *B05B 1/00* (2013.01); *C02F 1/685* (2013.01); *E03C 1/046* (2013.01); *B01F 2003/04886* (2013.01); *C02F 2201/784* (2013.01); *C02F 2307/06* (2013.01); *E03C 2201/40* (2013.01)

(58) Field of Classification Search
CPC ............ C02F 1/003; C02F 1/685; C02F 1/78; C02F 2201/004; C02F 2201/005; C02F 2201/784; E03C 1/046; E03C 2201/40; B05B 1/005; B01F 3/04; B01F 3/04099; B01F 2003/04865; B01F 2003/04872; B01F 2003/04879; B01F 2003/04886
See application file for complete search history.

(56) References Cited

U.S. PATENT DOCUMENTS

| 6,030,586 A * | 2/2000 | Kuan | ........................ | C02F 1/78 204/230.8 |
| 7,488,419 B1 * | 2/2009 | Wang | ........................ | C02F 1/78 210/198.1 |

* cited by examiner

*Primary Examiner* — Lucas Stelling
(74) *Attorney, Agent, or Firm* — Alan D Kamrath; Kamrath IP Lawfirm, P.A.

(57) ABSTRACT

An ozone faucet contains a body and a mixer. The body includes an outlet end and an ozone tube, and the outlet end has inner threads for screwing with a casing, between the casing and the outlet end is defined an accommodating space. The mixer includes a water guiding member, a resilient element, and a check tube. The water guiding member has a groove and a plurality of increasingly conical orifices, the resilient element is accommodated in the groove and has a stopping plug pushed by the resilient element. The check tube has a disc covering the water guiding member, the disc has a plurality of decreasingly conical apertures matching with the plurality of increasingly conical orifices The check tube also has a channel passing therethrough and contacting with the stopping plug, the mixer is secured in the accommodating space, and the check tube connects with the ozone tube.

8 Claims, 7 Drawing Sheets

OZONE FAUCET

FIELD OF THE INVENTION

The present invention relates to a faucet structure, and more particularly to an ozone faucet which is assembled easily and mixes water and ozone together.

BACKGROUND OF THE INVENTION

Figure 7:
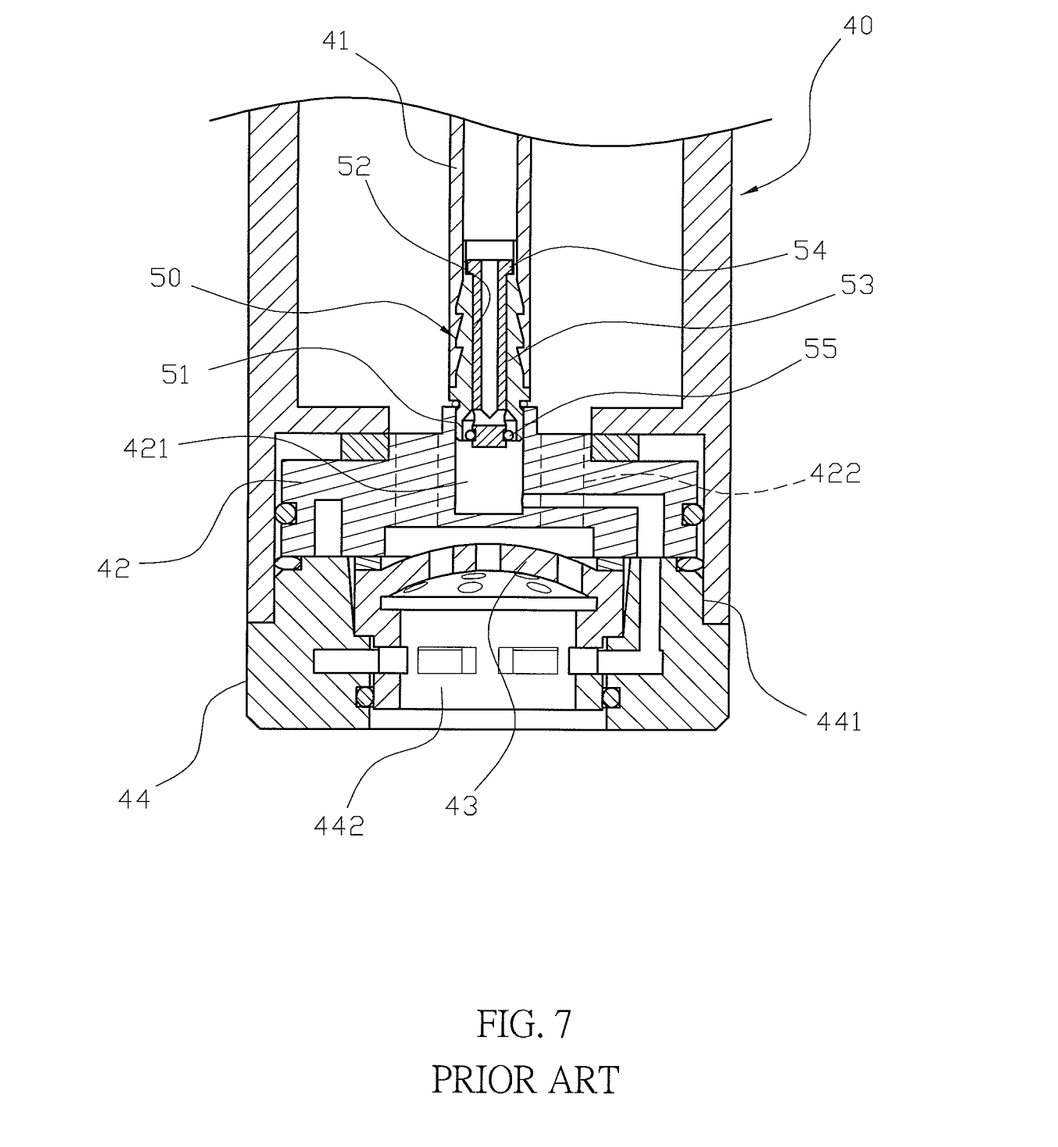
FIG. 7 is a cross sectional view of an outlet end of a conventional ozone faucet.

Conventional ozone supply member is coupled with an outlet end of a faucet so as to supply water with ozone. With reference to FIG. 7, a conventional ozone faucet contains an outlet end 40, and the outlet end 40 has an ozone tube 41 extending outwardly therefrom. The outlet end 40 has a check valve 50, a control ring 42, an aerator 43, and a spray head 44. The check valve 50 has a first end disposed on the ozone tube 41 and has a second end with a joining section 51. The check valve 50 further has a guiding hole 52 passing therethrough, a valve tube 53 inserted into the guiding hole 52, a stopping fringe 54 defined on a first end of the valve tube 53, and a closing ring 55 fitted on a second end of the valve tube 53. The control ring 42 has an air inlet 421 defined on a central portion and connecting with the joining section 51 of the check valve 50. The air inlet 421 has a through orifice 422 arranged around a peripheral side thereof, and the aerator 43 is mounted on the bottom end of the control ring 42, the spray head 44 has a locking portion 441 for locking with the outlet end 40, such that the ozone is mixed with water so as to sterilize, disinfect, deodorize, bleach, and preserve an object. When the water cannot flow out of the spray head 44, a water pressured is raised so as to control the water to adversely flow toward the air inlet 421 of the control ring 42, and then the valve tube 53 is pushed by the water pressure so that the closing ring 55 of the valve tube 53 contacts with the joining section 51 of the check valve 50, thus stopping the water flowing adversely.

However, the conventional ozone faucet still has defects as follows:

1. The check valve 50 has a valve tube 53 and is inserted into the ozone tube 41 of the outlet end 40, and the outlet end 40 is placed in the control ring 42, the spray head 44 is fixed on the aerator 43 and the outlet end 40 so that the control ring 42 is secured on the outlet end 40, since the outlet end 40 has an opening facing downwardly, the check valve 50 and the control ring 42 cannot have two outlet ends 40, and the control ring 42 cannot align with the spray head 44 exactly.

2. The ozone flows toward the check valve 50 from the ozone tube 41, and the water flows below the aerator 43 via the control ring 42 and the spray head 44, thereafter the water flows through the control ring 42 and the aerator 43 from the outlet end 40 and then flows out of the ozone faucet. In addition, the ozone is fed beside the aerator 43 by a pressure of an ozone end, so the ozone cannot be increased and cannot mix with the water.

3. When the water pressure is high or the spray head 44 is blocked, the closing ring 55 is pressed by the valve tube 53 and the guiding hole 52 to drop off, such that the check valve 50 cannot guide the water to flow in a single direction so that the water flows into the ozone tube 41. Furthermore, the valve tube 53 removes from the check valve 50 to slide into the ozone tube 41, thereby damaging ozone equipment.

4. The guiding hole 52 is provided to insert the valve tube 53 so that the water pushes the valve tube 53 to block the guiding hole 52, but when the water flows into the valve tube 53, it penetrates into the ozone tube 41, thus damaging the ozone equipment easily.

The present invention has arisen to mitigate and/or obviate the afore-described disadvantages.

SUMMARY OF THE INVENTION

The primary objective of the present invention is to provide an ozone faucet which is capable of overcoming the shortcomings of the conventional ozone faucet.

To obtain above-mentioned objective, an ozone faucet provided by the present invention contains: a body and a mixer.

The body includes an outlet end and an ozone tube disposed on the outlet end, and the outlet end has inner threads defined around an inner wall thereof and screwing with a casing, between the casing and the outlet end is defined an accommodating space.

The mixer includes a water guiding member, a resilient element, and a check tube. The water guiding member has a recess defined on a central portion thereof and a plurality of increasingly conical orifices surrounding around the recess, and a wide end of each increasingly conical orifice faces to a lower end of the casing, the resilient element is accommodated in the recess and has a stopping plug pushed by the resilient element, the check tube has a disc covering the water guiding member, the disc has a plurality of decreasingly conical apertures matching with the plurality of increasingly conical orifices, and a narrow end of each decreasing conical aperture faces to the water guiding member, the check tube also has a channel passing therethrough and contacting with the stopping plug, the mixer being secured in the accommodating space, and the check tube connects with the ozone tube.

Accordingly, the ozone faucet of the present invention has the following advantages:

1. The resilient element and the stopping plug of the mixer are retained between the check tube and the water guiding member so that the stopping plug blocks the check tube tightly, hence the water does not flow adversely, and when the ozone and the water flow into the plurality of increasingly conical orifices, the diameter of each increasingly conical orifice is increased so that the water and the ozone expand and stagnate to bubble, thus mixing the water and the ozone efficiently. Furthermore, the casing is screwed with the inner threads of the outlet end of the body, hence the mixer is positioned in the outlet end of the body easily, thus replacing the mixer quickly.

2. The check tube has the plurality of decreasingly conical apertures matching with the plurality of increasingly conical orifices so that the water flows through the plurality of decreasingly conical apertures to accelerate the flow speed, and the plurality of decreasingly conical apertures align with the plurality of increasingly conical orifices, the diameter of each decreasingly conical aperture is less than the diameter of each increasingly conical orifice so that the water flows into the water guiding member from the check tube quickly, and the water pressure in the clearance between the water guiding member and the check tube is more than the atmospheric pressure so that the water siphons the ozone to enhance ozone flow.

3. When the ozone and the water flow into the plurality of increasingly conical orifices of the water guiding member, the diameter of each increasingly conical orifice is increased so that the water and the ozone expand and stagnate to bubble, thus mixing the water and the ozone efficiently.

4. The resilient element is accommodated in the recess and has the stopping plug pushed by the resilient element, wherein the stopping plug contacts with the channel, such that after water supply is shut down, the resilient element pushes the stopping plug so that the stopping plug forces the channel of the check tube, hence the water in the outlet end will not penetrate into the ozone tube, i.e., the stopping plug blocks the channel of the check tube tightly, so the water does not flow adversely to damage the ozone equipment.

DETAILED DESCRIPTION OF THE PREFERRED EMBODIMENTS

Figure 1:
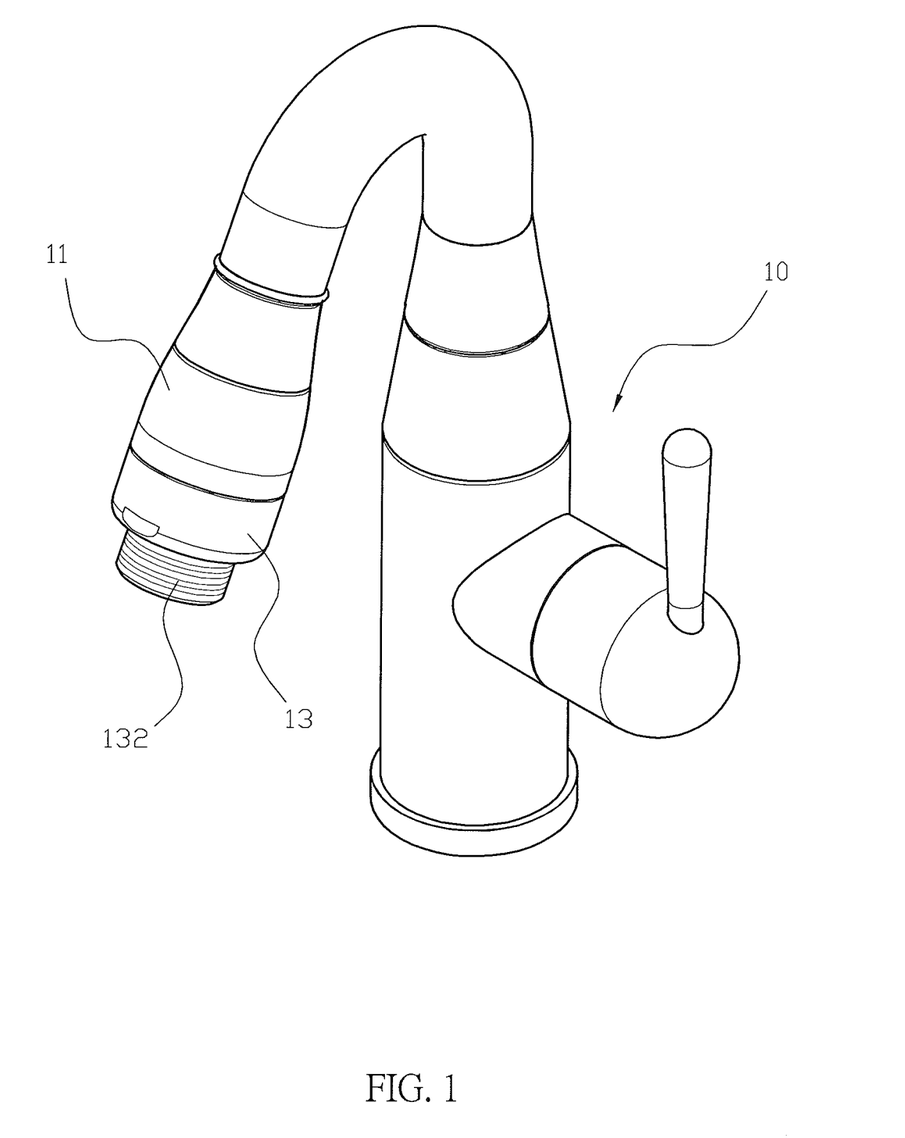
FIG. 1 is a perspective view showing the assembly of an ozone faucet according to a preferred embodiment of the present invention.
Figure 2:
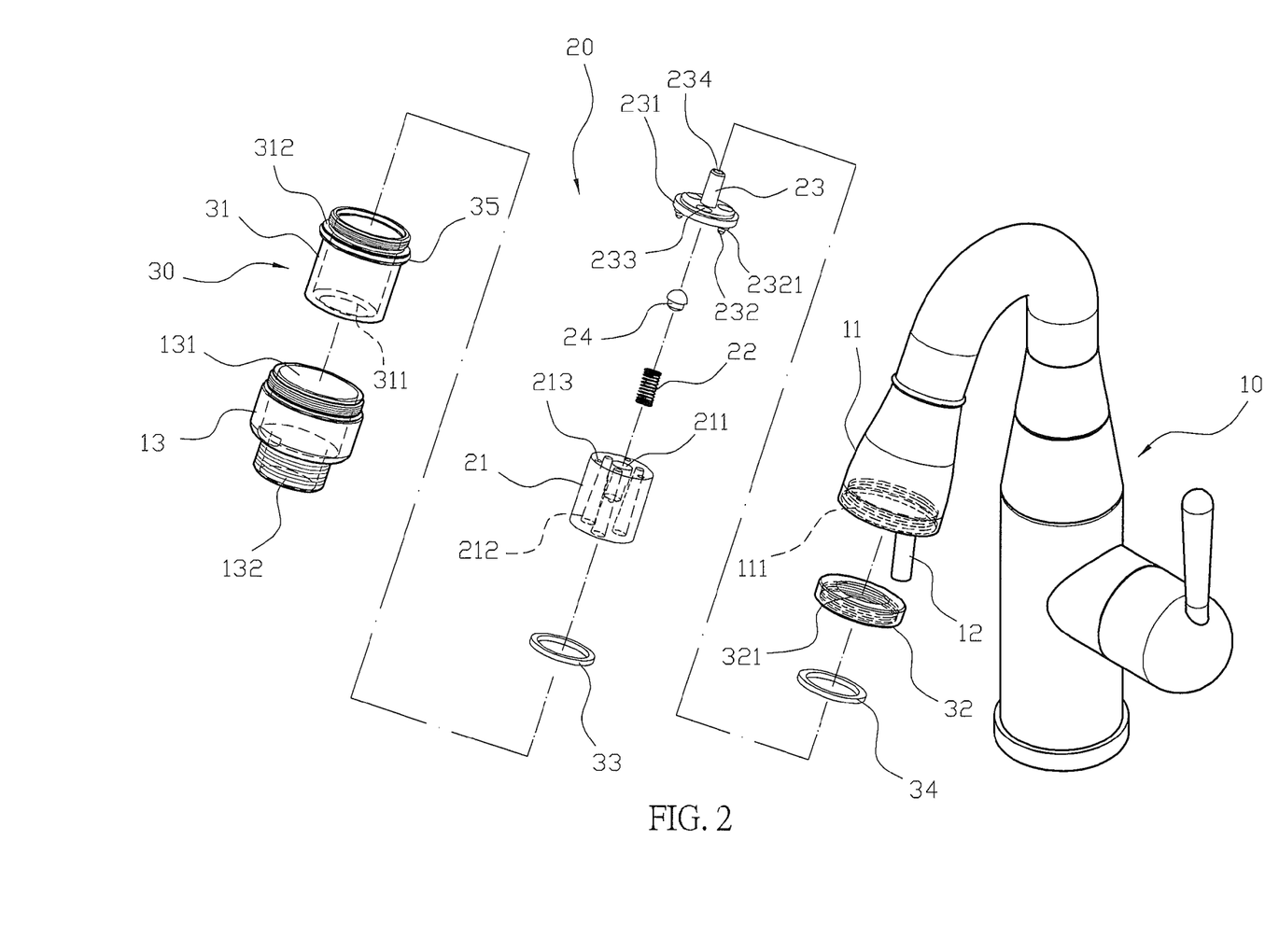
FIG. 2 is a perspective view showing the exploded components of the ozone faucet according to the preferred embodiment of the present invention.
Figure 3:
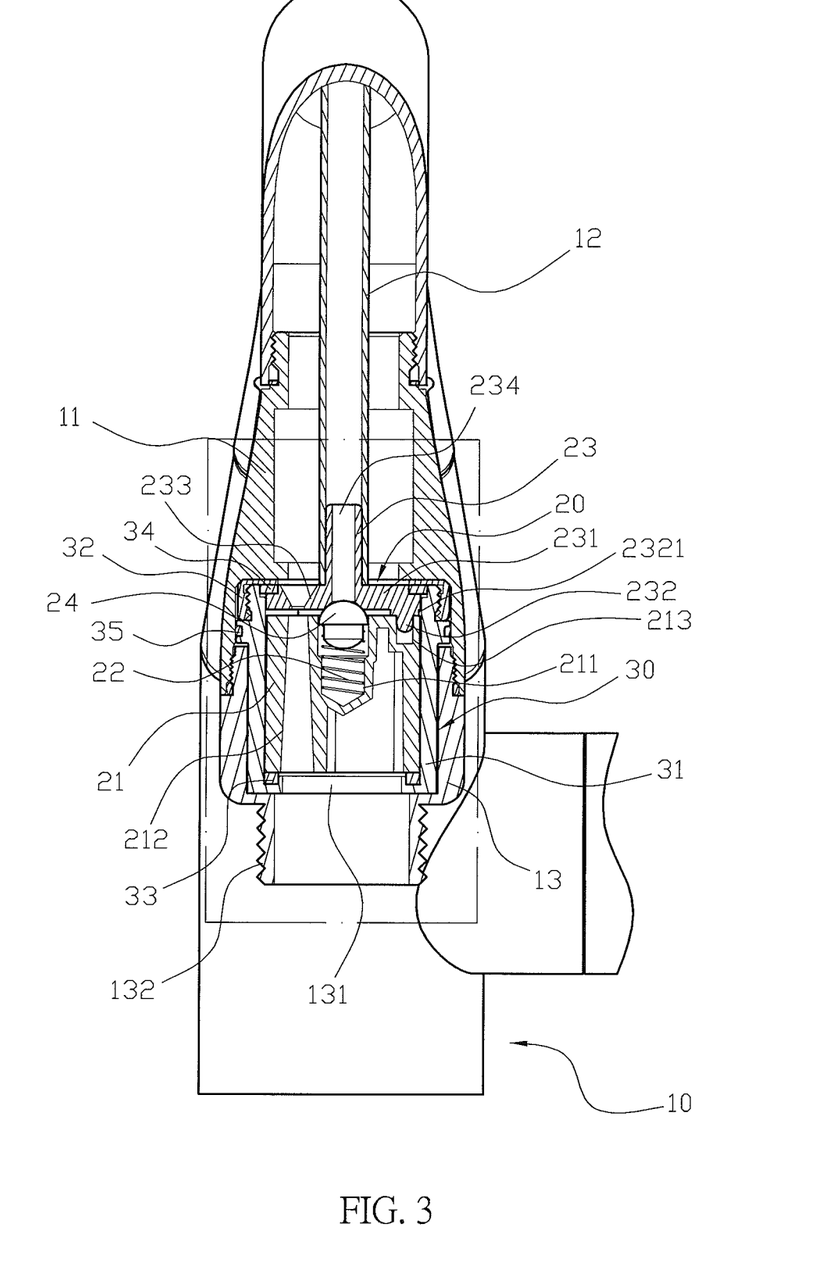
FIG. 3 is a cross sectional view showing the assembly of the ozone faucet according to the preferred embodiment of the present invention.

With reference to FIGS. 1-3, an ozone faucet according to a preferred embodiment of the present invention comprises a body 10, a mixer 20, and a fixing member 30.

Figure 6:
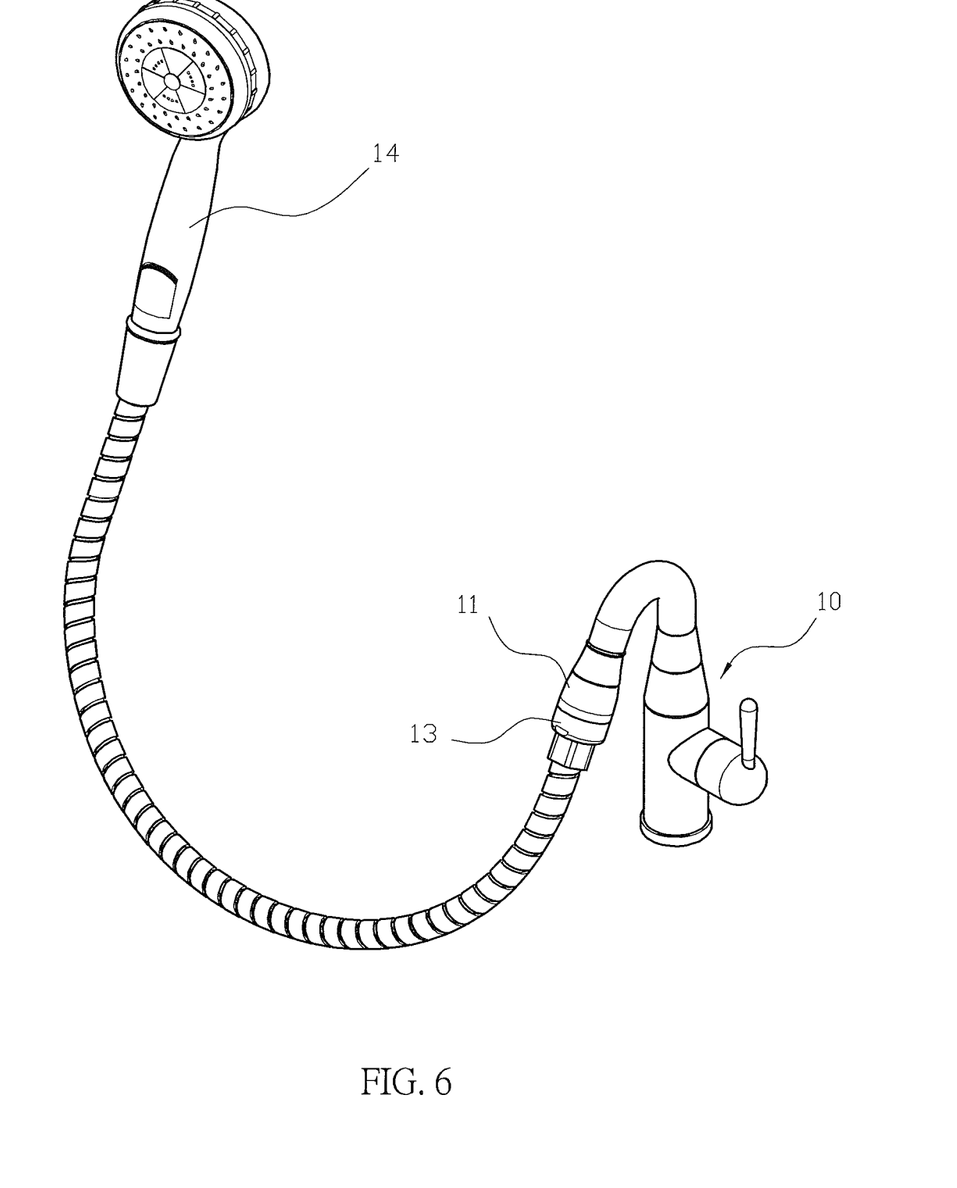
FIG. 6 is a perspective view showing the application of the ozone faucet according to the preferred embodiment of the present invention.

The body 10 includes an outlet end 11, an ozone tube 12 disposed on the outlet end 11, and the outlet end 11 has inner threads 111 defined around an inner wall thereof and screwing with a casing 13, and between the casing 13 and the outlet end 11 is defined an accommodating space 131, the casing 13 has a screwing section 132 formed around a lower end thereof so as to screw with a spray component 14 (as shown in FIG. 6), and the spray component 14 is a shower head.

The mixer 20 includes a water guiding member 21, a resilient element 22, and a check tube 23. The water guiding member 21 has a recess 211 defined on a central portion thereof and a plurality of increasingly conical orifices 212 surrounding around the recess 211, and a wide end of each increasingly conical orifice 212 faces to a lower end of the casing 13. The resilient element 22 is accommodated in the recess 211 and has a stopping plug 24 pushed by the resilient element 22. The check tube 23 has a disc 231 covering the water guiding member 21, and the water guiding member 21 also has a plurality of holes 213 adjacent to the plurality of increasingly conical orifices 212 and opposite to a plurality of bosses 232 on the disc 231 of the check tube 23, such that the plurality of bosses 232 retain with the plurality of holes 213 so that the check tube 23 is connected with the water guiding member 21. Also, each boss 232 has a spacing portion 2321 formed on a bottom end thereof so as to contact with each hole 213 such that a clearance is defined between the water guiding member 21 and the check tube 23. The disc 231 has a plurality of decreasingly conical apertures 233 matching with the plurality of increasingly conical orifices 212, and a narrow end of each decreasing conical aperture 212 faces to the water guiding member 21, the check tube 23 also has a channel 234 passing therethrough and contacting with the stopping plug 24, the mixer 20 is secured in the accommodating space 131, and the check tube 23 connects with the ozone tube 12 so that ozone flows through the channel 234 of the check tube 23 to push the stopping plug 24.

The fixing member 30 has a housing 31 and a screw loop 32 for screwing with the housing 31, such that the housing 31 and the screw loop 32 screw together to cover the mixer 20. The housing 31 has a first opening 311 for corresponding to a second opening 321 of the screw loop 32, and the plurality of decreasingly conical apertures 233 communicate with the plurality of increasingly conical orifices 212. The housing 31 also has a first washer 33 mounted in the first opening 311, and the screw loop 32 has a second washer 34 secured in the second opening 321, the housing 31 further has a peripheral rib 312 arranged around an outer rim thereof, the peripheral rib 312 has a sealing ring 35 fitted thereon and abutting against the inner wall of the outlet end 11, such that water does not leak among the outlet end 11, the mixer 20 and the fixing member 30.

Figure 4:
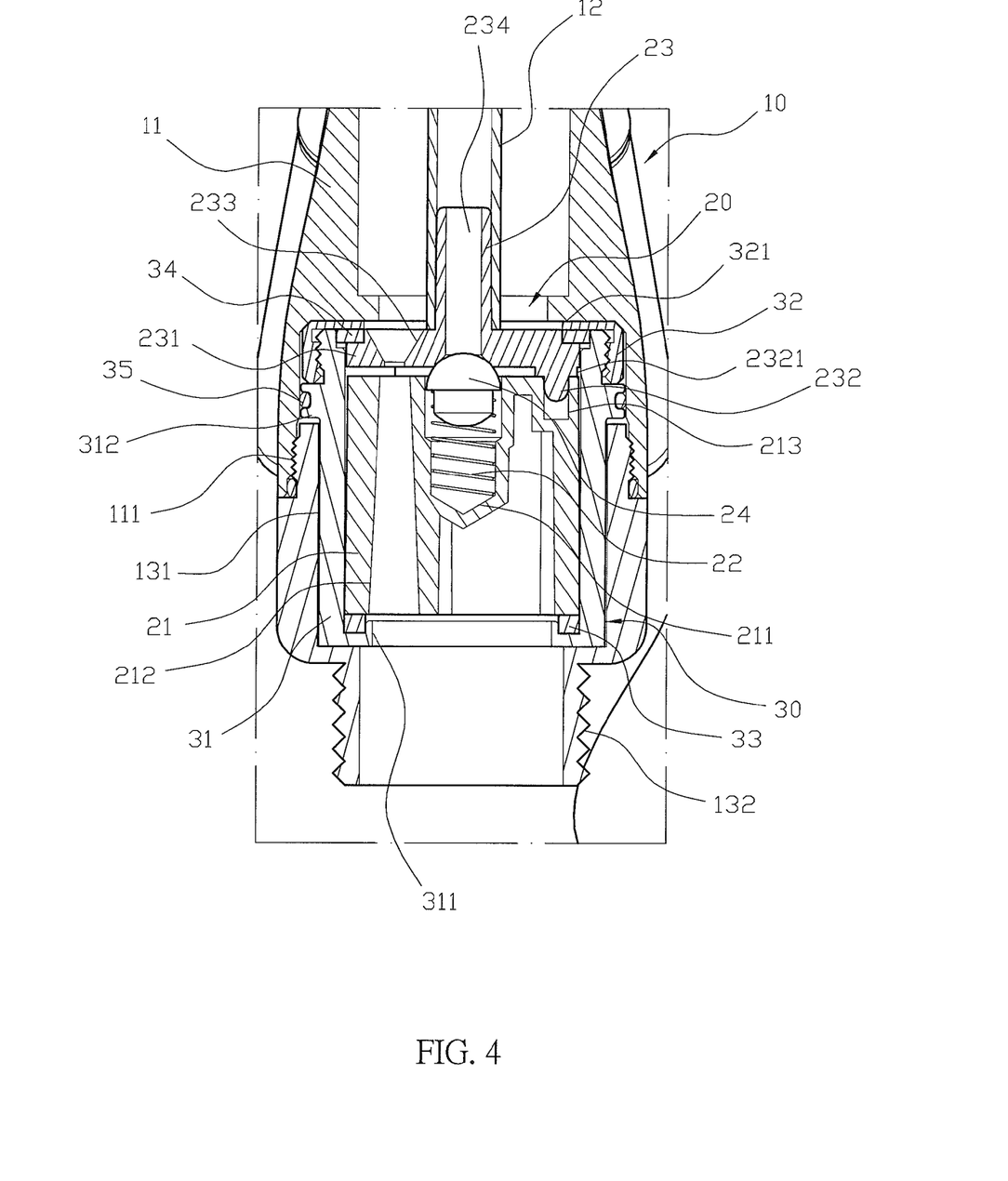
FIG. 4 is an amplified cross sectional view showing a part of FIG. 3.

In assembly, as shown in FIGS. 2 to 4, the resilient element 22 of the mixer 20 is placed in the recess 211 of the water guiding member 21, and the stopping plug 24 is biased against the resilient element 22, the disc 231 of the check tube 23 covers the water guiding member 21 so that the plurality of bosses 232 retain with the plurality of holes 213, and the plurality of decreasingly conical apertures 233 align with the plurality of increasingly conical orifices 212, thereafter the water guiding member 21 of the mixer 20 is placed in the housing 31 of the fixing member 30, the screw loop 32 is screwed with the housing 31 so that the screw loop 32 covers the mixer 20, and the channel 234 and the plurality of decreasingly conical apertures 233 of the mixer 20 expose outside the second opening 321 of the screw loop 32, the plurality of increasingly conical orifices 212 of the water guiding member 21 expose outside the first opening 311 of the housing 31, and the fixing member 30 is fixed in the accommodating space 131 of the casing 13, the check tube 23 of the mixer 20 is inserted into the ozone tube 12 of the body 10 so that the ozone tube 12 is in communication with the channel 234, and the casing 13 is screwed with the inner threads 111 of the outlet end 11 of the body 10, hence the mixer 20 is positioned in the outlet end 11 of the body 10 quickly.

Figure 5:
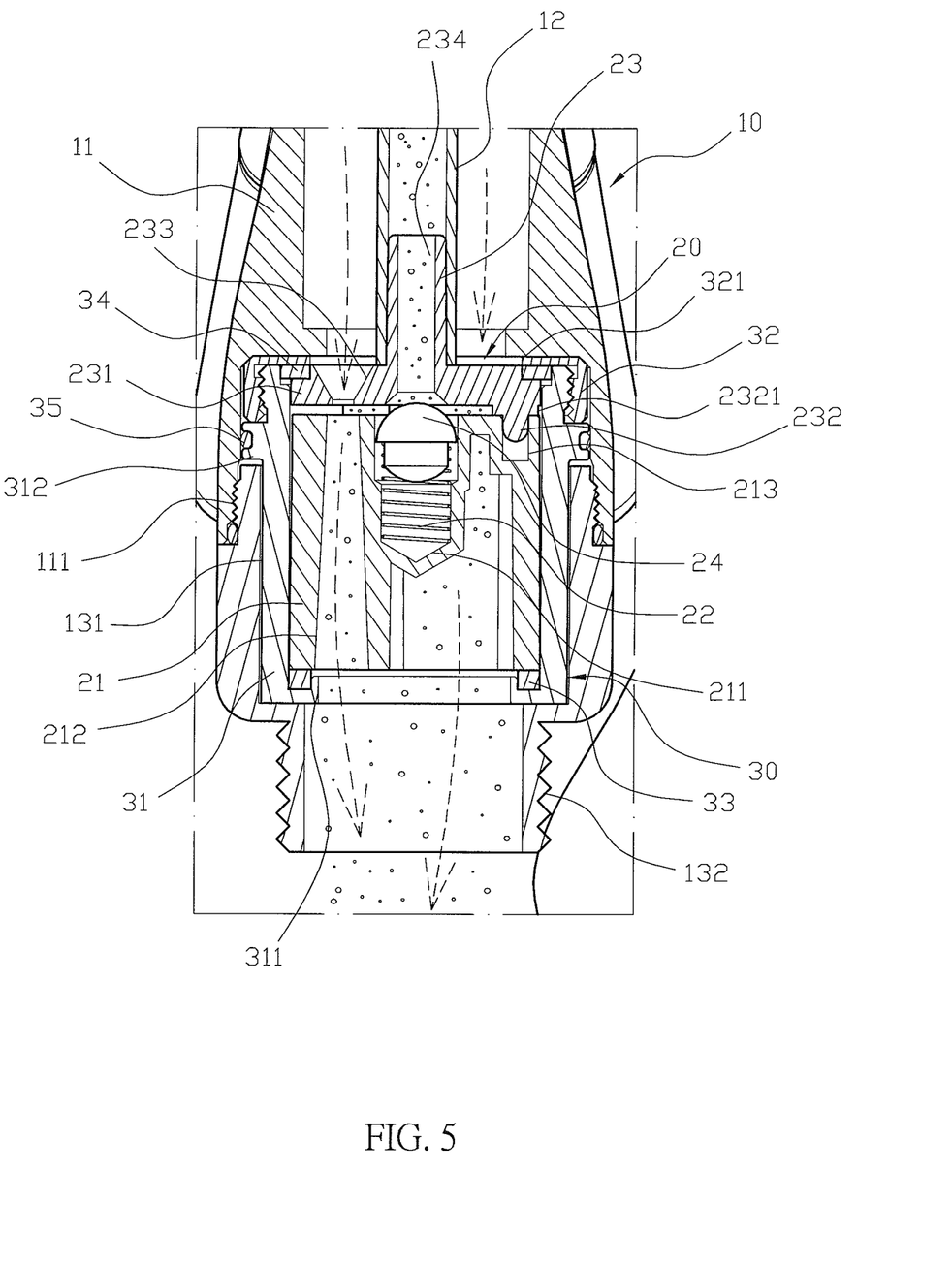
FIG. 5 is a cross sectional view showing the operation of the ozone faucet according to the preferred embodiment of the present invention.

In operation, as illustrated in FIGS. 4 to 6, the resilient element 22 of the mixer 20 pushes the stopping plug 24 so that the stopping plug 24 stops the channel 234 of the check tube 23, hence the water cannot adversely flow toward the channel 234 so as to protect ozone equipment. As desiring to supply ozone, the ozone flows into the channel 234 via the ozone tube 12 so as to produce ozone pressure to push the stopping plug 24 away, such that the ozone flows between the check tube 23 and the water guiding member 21 of the mixer 20, and the water flows into the plurality of decreasingly conical apertures 233 of the disc 231 from the outlet end 11 of the body 10 so as to accelerate a flow speed of the water, and the plurality of decreasingly conical apertures 233 align with the plurality of increasingly conical orifices 212, a diameter of each decreasingly conical aperture 233 is less than a diameter of each increasingly conical orifice 212 so that the water flows into the water guiding member 21 from the check tube 23, and water pressure in the clearance between the water guiding member 21 and the check tube 23 is more than atmospheric pressure so that the water siphons the ozone to enhance ozone flow. In addition, when the ozone and the water flow into the plurality of increasingly conical orifices 212, the diameter of each increasingly conical orifice 212 is increased so that the water and the ozone expand and stagnate to bubble, thus mixing the water and the ozone efficiently. After the casing 13 is blocked, the water flows adversely to push the stopping plug 24 of the mixer 20 so that the stopping plug 24 blocks the channel 234 of the check tube 23 tightly, hence the water does not flow adversely to damage the ozone equipment.

Accordingly, the ozone faucet of the present invention has the following advantages:

1. The resilient element 22 and the stopping plug 24 of the mixer 20 are retained between the check tube 23 and the water guiding member 21 so that the stopping plug 24 blocks the check tube 23 tightly, hence the water does not flow adversely, and when the ozone and the water flow into the plurality of increasingly conical orifices 212, the diameter of each increasingly conical orifice 212 is increased so that the water and the ozone expand and stagnate to bubble, thus mixing the water and the ozone efficiently. Furthermore, the casing 13 is screwed with the inner threads 111 of the outlet end 11 of the body 10, hence the mixer 20 is positioned in the outlet end 11 of the body 10 easily, thus replacing the mixer 20 quickly.

2. The check tube 23 has the plurality of decreasingly conical apertures 233 matching with the plurality of increasingly conical orifices 212 so that the water flows through the plurality of decreasingly conical apertures 233 to accelerate the flow speed, and the plurality of decreasingly conical apertures 233 align with the plurality of increasingly conical orifices 212, the diameter of each decreasingly conical aperture 233 is less than the diameter of each increasingly conical orifice 212 so that the water flows into the water guiding member 21 from the check tube 23 quickly, and the water pressure in the clearance between the water guiding member 21 and the check tube 23 is more than the atmospheric pressure so that the water siphons the ozone to enhance ozone flow.

3. When the ozone and the water flow into the plurality of increasingly conical orifices 212 of the water guiding member 21, the diameter of each increasingly conical orifice 212 is increased so that the water and the ozone expand and stagnate to bubble, thus mixing the water and the ozone efficiently.

4. The resilient element 22 is accommodated in the recess 211 and has the stopping plug 24 pushed by the resilient element 22, wherein the stopping plug 24 contacts with the channel 234, such that after the water supply is shut down, the resilient element 22 pushes the stopping plug 24 so that the stopping plug 24 forces the channel 234 of the check tube 23, hence the water in the outlet end 11 will not penetrate into the ozone tube 12, i.e., the stopping plug 24 blocks the channel 234 of the check tube 23 tightly, so the water does not flow adversely to damage the ozone equipment.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An ozone faucet comprising:
a body including an outlet end and an ozone tube disposed on the outlet end, and the outlet end having inner threads defined around an inner wall thereof and screwing with a casing, between the casing and the outlet end being defined an accommodating space;
a mixer including a water guiding member, a resilient element, and a check tube, the water guiding member having a recess defined on a central portion thereof and a plurality of increasingly conical orifices surrounding around the recess, and a wide end of each increasingly conical orifice facing to a lower end of the casing, the resilient element being accommodated in the recess and having a stopping plug pushed by the resilient element, the check tube having a disc covering the water guiding member, the disc having a plurality of decreasingly conical apertures matching with the plurality of increasingly conical orifices, and a narrow end of each decreasing conical aperture facing to the water guiding member, and the check tube also having a channel passing therethrough and contacting with the stopping plug, the mixer being secured in the accommodating space, and the check tube connecting with the ozone tube.

2. The ozone faucet as claimed in claim 1, wherein the water guiding member also has a plurality of holes adjacent to the plurality of increasingly conical orifices and opposite to a plurality of bosses on the disc of the check tube.

3. The ozone faucet as claimed in claim 2, wherein each boss has a spacing portion formed on a bottom end thereof so as to contact with each hole such that a clearance is defined between the water guiding member and the check tube.

4. The ozone faucet as claimed in claim 1 further comprising a fixing member, and the fixing member having a housing and a screw loop for screwing with the housing, such that the housing and the screw loop screw together to cover the mixer, wherein the housing has a first opening for corresponding to a second opening of the screw loop, and the plurality of decreasingly conical apertures communicate with the plurality of increasingly conical orifices.

5. The ozone faucet as claimed in claim 4, wherein the housing also has a first washer mounted in the first opening, and the screw loop has a second washer secured in the second opening.

6. The ozone faucet as claimed in claim 4, wherein the housing further has a peripheral rib arranged around an outer rim thereof, and the peripheral rib has a sealing ring fitted thereon and abutting against the inner wall of the outlet end.

7. The ozone faucet as claimed in claim 1, wherein the casing has a screwing section formed around the lower end thereof so as to screw with a spray component.

8. The ozone faucet as claimed in claim 7, wherein the spray component is a shower head.

* * * * *